(12) United States Patent
Essig

(10) Patent No.: US 9,017,498 B2
(45) Date of Patent: Apr. 28, 2015

(54) METHOD FOR PRODUCING A FUEL TANK

(75) Inventor: Ulrich Essig, Wendlingen (DE)

(73) Assignee: Dr. Ing h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/609,999

(22) Filed: Sep. 11, 2012

(65) Prior Publication Data

US 2013/0068377 A1 Mar. 21, 2013

(30) Foreign Application Priority Data

Sep. 15, 2011 (DE) .......................... 10 2011 053 631

(51) Int. Cl.
| | | |
|---|---|---|
| *B29C 39/10* | (2006.01) | |
| *B29C 44/12* | (2006.01) | |
| *B29C 69/00* | (2006.01) | |
| *B29C 49/64* | (2006.01) | |
| *B29C 45/00* | (2006.01) | |
| *B65D 81/38* | (2006.01) | |
| *B29L 31/00* | (2006.01) | |
| *B60K 15/03* | (2006.01) | |
| *B29C 49/04* | (2006.01) | |

(52) U.S. Cl.
CPC ...... *B29C 44/1271* (2013.01); *B29L 2031/7172* (2013.01); *B60K 15/03177* (2013.01); *B29C 69/007* (2013.01); *B29C 49/04* (2013.01); *B29C 49/64* (2013.01); *B29C 45/0053* (2013.01)

(58) Field of Classification Search
CPC .... B29C 69/007; B29C 69/008; B29C 69/02; B29C 44/1271; B29C 44/1219; B29C 44/146; B29C 2045/14131; B29C 44/1266; B29C 49/4273; B29C 67/227; B29C 67/2265; B29C 44/129

USPC .............. 220/560.15, 562, 592.25, 905; 264/46.4, 46.8, 250, 259, 271.1, 279

See application file for complete search history.

(56) References Cited

U.S. PATENT DOCUMENTS

| | | | | |
|---|---|---|---|---|
| 1,605,740 | A * | 11/1926 | Johnson ........................ | 215/13.1 |
| 2,958,907 | A * | 11/1960 | Mumford et al. ............ | 264/45.7 |
| 3,037,652 | A * | 6/1962 | Wallace ........................ | 215/12.2 |
| 4,668,567 | A * | 5/1987 | Williams ..................... | 428/319.9 |
| 4,768,678 | A * | 9/1988 | Nusbaumer et al. ........ | 220/567.3 |
| 6,071,370 | A * | 6/2000 | Stiles .............................. | 156/285 |
| 6,533,002 | B1 * | 3/2003 | Kobayashi et al. ........... | 141/302 |
| 6,719,163 | B1 | 4/2004 | Delbarre et al. | |

FOREIGN PATENT DOCUMENTS

| | | | |
|---|---|---|---|
| DE | 199 46 530 | | 3/2001 |
| DE | 10 2008 036 894 | | 2/2010 |
| JP | 06198658 | A * | 7/1994 |

* cited by examiner

*Primary Examiner* — William Bell
(74) *Attorney, Agent, or Firm* — Gerald E. Hespos; Michael J. Porco; Matthew T. Hespos

(57) ABSTRACT

A method is provided for producing a fuel tank of a motor vehicle, with an insulation applied to an outer side of a fuel tank container by application of foam, wherein the fuel tank container is placed into a foam-encapsulating mold and at least partially encapsulated in the foam insulation, the foam-encapsulating mold forming a first mold half and the fuel tank container forming a second mold half.

6 Claims, No Drawings

METHOD FOR PRODUCING A FUEL TANK

CROSS REFERENCE TO RELATED APPLICATION

This application claims priority under 35 USC 119 to German Patent Appl. No. 10 2011 053 631.0 filed on Sep. 15, 2011, the entire disclosure of which is incorporated herein by reference.

BACKGROUND OF THE INVENTION

1. Field of the Invention

The invention relates to a method for producing a fuel tank of a motor vehicle.

2. Description of the Related Art

DE 10 2008 036 894 A1 discloses a fuel tank with a foam insulation applied to a fuel tank container of the fuel tank. According to this prior art, the insulated fuel tank is produced by first providing a fuel tank container and then applying an insulating foam plastic to the fuel tank.

The fuel tank container of the fuel tank to which the foam insulation is applied may be produced for example by blow molding, as known from DE 199 46 530 B4.

The object of the invention is to provide a novel method for producing a fuel tank.

SUMMARY OF THE INVENTION

The invention relates to a method for producing a fuel tank that includes placing the fuel tank container into a foam-encapsulating mold and at least partially encapsulating the fuel tank container in the foam insulation. The foam-encapsulating mold forms a first mold half and the fuel tank container forms a second mold half. The method includes placing the fuel tank container into a foam-encapsulating mold and at least partially encapsulating the fuel tank container in the foam insulation by the foam-encapsulating mold forming a first mold half and the fuel tank container forming a second mold half. With such a method reduces the complexity of the equipment for producing an insulated fuel tank.

The fuel tank container preferably is made of plastic. The encapsulation of the fuel tank container in the foam insulation preferably is carried out directly following the production of the fuel tank container and while the fuel tank container is still hot. Thus, plastic of the insulation fuses together with an outer layer of the plastic of the fuel tank container. More particularly, the fuel tank container and the insulation preferably enter into a monolithic bond. Hence, the fuel tank container cannot move relative to the insulation during operation and undesired noises associated with such movement can be avoided.

The plastic fuel tank container preferably is produced by blow molding and the foam encapsulation of the fuel tank container preferably is carried out in a cooling mold of the blow-molding process, so that the cooling mold is used as a foam-encapsulating mold. Using the cooling mold of the blow-molding process as the foam-encapsulating mold avoids the need for a separate mold for foam-encapsulating the fuel tank container.

Further features and combinations of features are apparent from the detailed description of the invention that follows.

DETAILED DESCRIPTION OF THE PREFERRED EMBODIMENT

The invention relates to a method for producing a fuel tank with an insulation applied to an outer side of a fuel tank container by applying foam or encapsulation in foam.

The fuel tank container may be made of plastic or metal. The fuel tank container is placed into a foam-encapsulating mold and at least partially encapsulated in the insulation of foam plastic so that the foam-encapsulating mold forms a first mold half and a surface of the fuel tank container that is to be encapsulated in foam forms a second mold half. This reduces the complexity of the equipment for producing the fuel tank.

The fuel tank container preferably is made of plastic and is encapsulated at least partially in foam insulation, preferably of polyethylene. The at least partial encapsulation of the fuel tank container in the foam insulation preferably is carried out directly following the production of the fuel tank container and while the fuel tank container is still hot. As a result, the plastic of the insulation fuses together with an outer layer of the plastic of the fuel tank container, so that the insulation and the fuel tank container enter into an intimate bond. Accordingly, there is no risk of relative movements between the fuel tank container and the insulation during operation of the vehicle and undesired noises associated with such movement are avoided.

The fuel tank container made of plastic preferably is produced by blow molding. The foam encapsulation then preferably is performed in a cooling mold of the blow-molding process while the fuel tank container is still hot so that the insulation and the fuel tank container can fuse together. The cooling mold of the blow-molding process then functions as a foam-encapsulating mold.

The invention provides a particularly effective method for producing an insulated fuel tank. Encapsulation of the fuel tank container in the foam insulation preferably takes place over its full surface area, or completely, with the exception of the inlet nozzle and outlet nozzle of the fuel tank container.

What is claimed is:

1. A method for producing a foam-insulated fuel tank for a motor vehicle, comprising:
    using a heated plastic to blow mold a fuel tank container in a blow molding mold to form a hot fuel tank container;
    placing the hot blow molded fuel tank container in a cooling mold; and
    inserting a foam insulation between the cooling mold and an outer surface of the blow molded fuel tank container while the fuel tank container is still hot, thereby causing the foam insulation to fuse together with the outer surface of the plastic of the hot fuel tank container and at least partially encapsulating the fuel tank container with the foam insulation.

2. The method of claim 1 further comprising forming a monolithic bond between the fuel tank container and the foam insulation.

3. The method of claim 1, wherein the plastic used to form the fuel tank container polyethylene.

4. The method of claim 1, wherein the at least partially encapsulating the fuel tank container with the foam insulation comprises encapsulating all of the outer surface of the fuel tank container except an inlet and an outlet thereof.

5. A method for producing a foam-insulated fuel tank for a motor vehicle, comprising:
    performing a blow molding step to produce a hot fuel tank container;
    placing the hot blow molded fuel tank container in a cooling mold; and
    filling a space between the cooling mold and an outer surface of the hot blow molded fuel tank with a foam insulation so that the foam insulation fuses to the outer surface of the hot blow molded fuel tank and defines a monolithic bond between the foam insulation and the fuel tank container.

6. The method of claim 5, wherein the fuel tank container is made from polyethylene.

\* \* \* \* \*